United States Patent
Lin et al.

(10) Patent No.: US 9,439,205 B1
(45) Date of Patent: Sep. 6, 2016

(54) LOCATION BASED WIRELESS NETWORK OPTIMIZATION IN EMBEDDED SYSTEMS

(71) Applicant: Alpine Electronics of Silicon Valley, Inc., Santa Clara, CA (US)

(72) Inventors: Rocky Chau-Hsiung Lin, Cupertino, CA (US); Thomas Yamasaki, Anaheim Hills, CA (US); Koichiro Kanda, San Jose, CA (US); Hirokazu Yamashita, Sagamihara (JP)

(73) Assignee: Alpine Electronics of Silicon Valley, Inc., Santa Clara, CA (US)

( * ) Notice: Subject to any disclaimer, the term of this patent is extended or adjusted under 35 U.S.C. 154(b) by 0 days.

(21) Appl. No.: 15/043,309

(22) Filed: Feb. 12, 2016

(51) Int. Cl.
*H04L 12/28* (2006.01)
*H04W 72/08* (2009.01)
*H04L 29/08* (2006.01)
*H04W 24/02* (2009.01)
*H04J 1/16* (2006.01)

(52) U.S. Cl.
CPC ............ *H04W 72/082* (2013.01); *H04L 67/12* (2013.01); *H04W 24/02* (2013.01)

(58) Field of Classification Search
USPC ................ 370/252, 329, 338, 386
See application file for complete search history.

(56) References Cited

U.S. PATENT DOCUMENTS

| | | | | |
|---|---|---|---|---|
| 2004/0230374 | A1* | 11/2004 | Tzamaloukas | G01C 21/28 701/495 |
| 2005/0249145 | A1* | 11/2005 | Wilson | H04B 7/18582 370/316 |
| 2009/0219900 | A1* | 9/2009 | Kokkinen | B61L 15/0027 370/338 |
| 2015/0092676 | A1* | 4/2015 | Periyalwar | H04W 76/025 370/329 |

* cited by examiner

*Primary Examiner* — John Pezzlo
(74) *Attorney, Agent, or Firm* — Perkins Coie LLP

(57) ABSTRACT

Method and devices for optimizing wireless network connections in transportation vehicles are provided. An onboard computing device in a transportation vehicle identifies blackout area with severe wireless signal interference caused by nearby wireless access points in the blackout area. The wireless interference can be remedied by dynamically switching wireless channel for the in-vehicle wireless connection between the onboard computing device and a mobile device in the vehicle. The wireless interference can also be remedied by pre-caching the data needed for a content presentation during a time period when the vehicle travels within the blackout area.

20 Claims, 5 Drawing Sheets

… … …

LOCATION BASED WIRELESS NETWORK OPTIMIZATION IN EMBEDDED SYSTEMS

TECHNICAL FIELD

The present invention is directed to optimizing wireless network connections, particularly to optimizing wireless network connections of systems embedded in vehicles.

BACKGROUND

Wireless communications are widely used for transmission of signals including data, text, sound and video. Particularly, WIFI is a local area wireless networking technology allowing devices to connect to a network, commonly using 2.4 gigahertz (GHz) and 5 gigahertz ISM (industrial, scientific and medical) radio bands. A WIFI wireless local area network (WLAN) operates based on the Institute of Electrical and Electronics Engineers (IEEE) 802.11 standards. Various devices, e.g., personal computers, game consoles, smart phones, digital cameras, and tablet computers, use WIFI to connect to network resource (e.g., the Internet) via wireless network access points (also referred to as hotspots). An access point typically has an indoor range of 20 meters and an even greater outdoor range.

Connection to a WIFI network can be interfered or disrupted by other WIFI networks in nearby regions. For example, many 2.4 GHz access points operate on the same default channel on initial setup. Excessive number of access points, operating on the neighboring channel in the same area, can prevent access and interfere with other devices' use of other access points.

The number of wireless WIFI access points deployed increases every year. Both corporate entities and private families deploy wireless LANs. Typically there is no coordination between the wireless LAN networks during the planning and deployment stages. Therefore, devices within a wireless LAN network can experience interferences generated by devices of other wireless LAN networks. The interference problem becomes even more prominent when the WIFI access points have better signal ranges and can cover outdoor areas.

SUMMARY

The present inventors recognized the need to create a mechanism for optimizing the wireless network connection of a system in a mobile environment, such as a system embedded in a transportation vehicle. Further, the present inventors recognized the need to anticipate that the transportation vehicle travels through areas with greater interferences from other WIFI networks (blackout areas) and maintain the wireless connection within the transportation vehicle.

Various implementations of the subject matter described herein may provide one or more of the following advantages. In one or more implementations, the techniques and apparatus described herein can detect a destination location of the transportation vehicle and identify potential routes to the destination location. Based on the potential routes, the techniques and apparatus can identify blackout areas that the transportation vehicle can travel through along the routes, and pre-cache needed information in anticipation of the blackout areas.

In various implementations the WIFI connection experience in the transportation vehicle can be enhanced by dynamically switching WIFI channels to avoid crowded WIFI channels in areas having severe WIFI interferences, e.g., dense urban locations.

These general and specific techniques can be implemented using an apparatus, a method, a system, or any combination of apparatuses, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
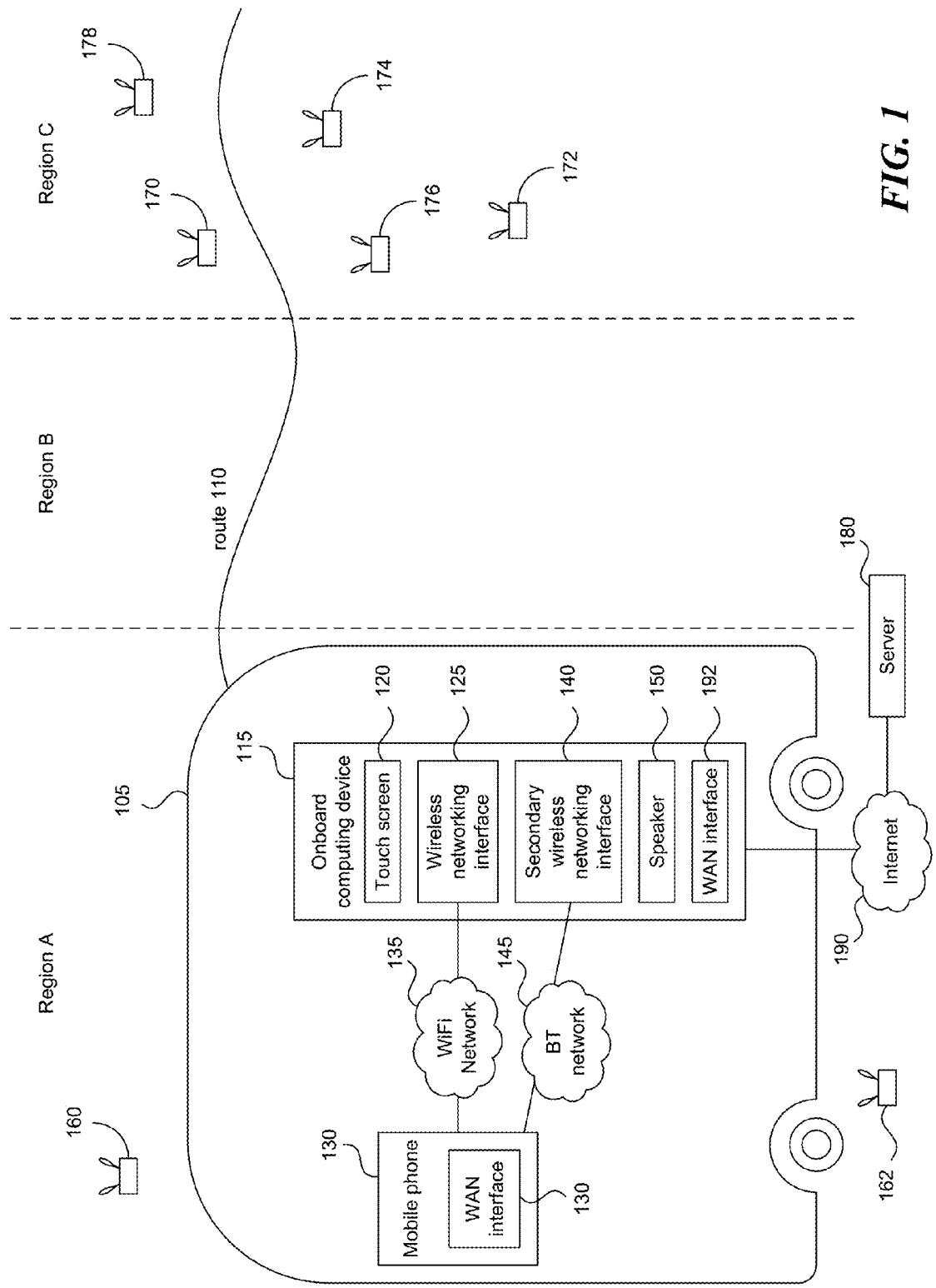
FIG. 1 shows a wireless network in a transportation vehicle environment.

FIG. 1 shows a wireless network in a transportation vehicle environment 100. The transportation vehicle 105 is travelling along a route 110. Although FIG. 1 shows that the transportation vehicle 105 as a wheeled vehicle travelling on land. The transportation vehicle can also be a vehicle travelling on water, under water, or in air. For example the transportation vehicle 105 can be, e.g., a car, a motorcycle, a land vehicle, a ship, a boat, a hovercraft, a submarine, an airplane, a helicopter, an unmanned aerial vehicle (UAV), etc.

The transportation vehicle 105 can include an onboard computing device 115 (also referred to as embedded computing device). In some implementations, the onboard computing device 115 can be installed as a part of the center console (also referred to as dashboard) or as a headunit of the transportation vehicle 105. The onboard computing device 115 can provide various functionalities for the driver and passengers of the transportation vehicle 105. For example, the onboard computing device 115 can provide an automotive navigation system based on the GPS (Global Positioning System) signals.

The onboard computing device 115 can include an input interface (e.g., a touch screen 120) allowing the driver or passenger to control the entertainment or stereo system of the transportation vehicle 105. The input interface of the onboard computing device 115 can further allow the driver or passenger to control other functionalities of the transportation vehicle 105, e.g., temperature control, in-car entertainment, trip computer, handless phone call, etc.

The onboard computing device 115 can also include an output interface (e.g., the touch screen 120). The output interface may display various types of information for the transportation vehicle 105, e.g., travelling speed, temperature, map of the automotive navigation system, or song playing interface. The output interface can also display video graphics for the in-car entertainment system. In some implementations, the onboard computing device 115 can include single component serving as both the input interface and the output interface, such as the touch screen 120 as shown in FIG. 1.

The onboard computing device 115 can include a primary wireless networking interface 125 for establishing a wireless network connection with one or more devices in the local environment. In some implementations, the wireless networking interface 125 can be a WIFI access point or a WIFI router. The wireless networking interface 125 can connect to various types of devices over a wireless network connection (e.g., a WIFI WLAN or WPAN). For example, FIG. 1 shows that the wireless networking interface 125 connects to a mobile phone 130 over a WIFI network 135. The wireless networking interface 125 can connect to other devices, e.g., personal computers, game consoles, smart phones, digital cameras, or tablet computers.

In some implementations, the primary wireless networking interface 125 can include a physical wiring port. Through the physical wiring port, the onboard computing device 115 can establish a wired communication connection with a mobile device in the local environment through a physical cable. The wired communication connection can serve, e.g., as a temporary replacement for the WIFI network 135. For example, the transportation vehicle 105 travels within a blackout area and the onboard computing device 115 experience significant signal interference on the WIFI network 135. In order to maintain proper communication when the transportation vehicle 105 is in the blackout area, the onboard computing device 115 prompts the driver (e.g., on the touch screen) to connect the mobile device to the physical wiring port through a physical cable. The physical wiring port can be, e.g., a USB port, a lightning port, a RJ-45 port, an HDMI port, a Thunderbolt port, a DisplayPort port, etc.

In some implementations, the onboard computing device 115 can further include a secondary wireless networking interface 140. For example, the secondary wireless networking interface 140 can be a BLUETOOTH component connecting to other devices over a BLUETOOTH network 145. The secondary wireless networking interface 140 typically can handle a communication bandwidth lower than the communication bandwidth of the primary wireless networking interface 125. However, the secondary wireless networking interface 140 typically consumes less energy and is less susceptible to interference from nearby wireless networks, comparing to the primary wireless networking interface 125. The secondary wireless network interface 140 can also use a NFC.

In some implementations, the secondary wireless networking interface 140 can include a physical wiring port. Through the physical wiring port, the onboard computing device 115 can establish a wired communication connection with a mobile device in the local environment through a physical cable, as a temporary replacement for the BLUETOOTH network 145. In some implementations, the primary wireless networking interface 125 and the secondary wireless networking interface 140 can share a single physical wiring port.

The WIFI network 135 connecting the onboard computing device 115 and the mobile phone 130 can achieve various functionalities. For example, in some implementations, the mobile phone 130 can transmit data streams of videos (e.g., movies or clips from video-sharing websites), audios (e.g., songs, audio books, phone conversations), photos, or email over the WIFI network 135 to the onboard computing device 115. The onboard computing device 115 continues receiving the data streams through the wireless networking interface 125 and playing the content of the data streams using the touch screen 120, speakers 150 of the transportation vehicle 105, and other suitable components of the transportation vehicle 105.

In some other implementations, the driver or passenger of the transportation vehicle 105 can decide to use a navigation application installed on the mobile phone 130, instead of using the automotive navigation system of the onboard computing device 115. The mobile phone 130 can transmit audio and/or video data over the WIFI network 135 in real time to the onboard computing device 115, such that onboard computing device 115 can play in real time the audio prompts and/or navigation maps generated by the a navigation application of the mobile phone 130.

In some other implementations, the mobile phone 130 can utilize the WIFI network 135 to integrate with the onboard computing device 115. The mobile phone 130 sends data streams for video and/or control signals to the onboard computing device 115 in real time, the onboard computing device 115 operates as a remote interface for the mobile phone 130 and generates and displays video signals based on the received real-time data streams. If a driver or passenger provides an input to the onboard computing device 115 (e.g., by touching the touch screen 120), the onboard computing device 115 sends the input signals back to the mobile phone 130 in real time.

The above-mentioned functionalities rely on a proper communication over the WIFI network 135. However, due to the mobile nature of the transportation vehicle 105, the WIFI network 135 can experience signal interferences from wireless networks originated from regions outside of the cabin of the transportation vehicle 105.

FIG. 1 shows that the transportation vehicle 105 is currently travelling in a region A along the route 110. In the region A, there are two nearby wireless access points 160 and 162. The wireless access point 160 operates at channel 1 (2412 MHz) of the 2.4 GHz frequency bands. The wireless networking interface 125 detects the strength of the signal from the wireless access point 160 is −96 decibel-milliwatts (dBm). The wireless access point 160 operates at channel 11 (2462 MHz) of the 2.4 GHz frequency bands. The wireless networking interface 125 detects the strength of the signal from the wireless access point 162 is −92 decibel-milliwatts (dBm). The wireless networking interface 125 of the onboard computing device 115 operates at channel 6 (2437 MHz) of the 2.4 GHz frequency bands.

The WIFI network 135 can experience some interference from the wireless access points 160 and 162 (as well as devices interacting with these access points). The onboard computing device 115 assesses various factors, such as the number of nearby access points, the WIFI signal strengths of the nearby access points, the channel differences between the wireless networking interface 125 and the nearby access points. Based on these factors, the onboard computing device 115 determines that the interference will not cause significant disruption of the WIFI network 135 and allows the wireless networking interface 125 to continue operating at channel 6 of 2.4 GHz bands.

The transportation vehicle 105 continues travelling along the route 110 and reaches the region B. In the region B, there no nearby wireless access points. The onboard computing device 115 determines that there is no external WIFI interference that will cause significant disruption of the WIFI network 135 and allows the wireless networking interface 125 to continue operating at channel 6 of 2.4 GHz bands.

The transportation vehicle 105 then continues travelling along the route 110 and reaches the region C. In the region C, there are five nearby wireless access points 170, 172, 174, 176 and 178. The wireless access point 170 operates at channel 6 (2437 MHz) of the 2.4 GHz frequency bands. The wireless networking interface 125 detects that the strength of the signal from the wireless access point 170 is −60 dBm. The wireless access point 172 operates at channel 1 with a signal strength of −72 dBm. The wireless access point 174 operates at channel 5 with a signal strength of −62 dBm. The wireless access point 176 operates at channel 6 with a signal strength of −65 dBm. The wireless access point 178 operates at channel 11 with a signal strength of −68 dBm.

The wireless networking interface 125 of the onboard computing device 115 operates at channel 6. The strength of the signals transmitted from the mobile phone 130 is −37 dBm. There are five nearby access points. The WIFI signal strengths of the nearby access points are strong (−72 dBm~−60 dBm). The operating channels of the wireless access points 170, 174 and 176 are at the same channel or neighboring channel at which the wireless networking interface operates. Based on these factors, the onboard computing device 115 determines that the interference possibly will cause significant disruption of the WIFI network 135 and instructs the wireless networking interface 125 to switch to a channel with less interference (e.g., channel 9).

If the wireless networking interface 125 still experiences significant WIFI signal interference after switching to channel 9, the onboard computing device 115 can disconnect the WIFI network 135 and instead use the BLUETOOTH network 145 for communications between the onboard computing device 115 and the mobile phone 130. Because the BLUETOOTH network 145 has a lower bandwidth, the onboard computing device 115 can instruct the mobile phone to accommodate the lower bandwidth. For example, in some implementations, the mobile phone 130 was sending video streams to the onboard computing device 115 over the WIFI network 135 before reaching the region C. Once the onboard computing device 115 disconnects the WIFI network 135, the onboard computing device 115 can instruct the mobile phone 130 to send the video streams in lower resolution or even send only the audio portion of the video streams, such that the onboard computing device 115 can continue to replay the video streams (or the audio portion) in real time without noticeable disruption.

The onboard computing device 115 can mark the region C as a blackout area for future reference. Since the WIFI environment of region C can change over time (e.g., depending time of the day and day of the week), the onboard computing device 115 can record the timestamp along with the mark of the blackout area for future reference. The onboard computing device 115 can further record detailed information regarding the WIFI interference in the region C, such as the number of nearby access points, the WIFI signal strengths of the nearby access points, the channels at which the nearby access points operate. The aggregated set of information regarding the WIFI interferences and blackout areas can be referred to as wireless interference data.

Once the region C is marked as a blackout area, the onboard computing device 115 can anticipate the severe WIFI interference in the region C, and plan ahead for the WIFI connection 135. For example, in some implementations, the onboard computing device 115 receives an input from the driver of the transportation vehicle for a destination location. The automotive navigation system of the onboard computing device 115 generates a possible route from the current vehicle location to the destination location. The onboard computing device 115 further determines that the blackout region C is on the generated route. Since the onboard computing device 115 anticipates that the transportation vehicle will travel through the region C, the onboard computing device 115 can instruct the wireless networking interface 125 to switch upfront to a channel that will have less WIFI interference in blackout region C.

Even without destination inputs from the driver, the onboard computing device 115 can generate a reasonable estimation of the possible destination based on the past commute pattern of the transportation vehicle 105. For example, in some implementations, the onboard computing device 115 records the history of times and locations that the transportation vehicle 105 travels. As an example, based on the historical data, the onboard computing device 115 determines that the transportation vehicle 105 travels to a particular workplace location on 8:00 AM every workday. On a workday morning, without the driver inputting any destination location, the onboard computing device 115 can automatically estimate that the next destination will likely be the workplace location and the blackout region C will be on the route to the workplace location. Accordingly, the onboard computing device 115 can take preventive measures to minimize the impact of the WIFI interference in the blackout region C, e.g., switching channel.

In some implementations, the onboard computing device 115 can determine based on the wireless interference data that the wireless networking interface 125 is going to experience disrupting WIFI interference in the blackout region C no matter which channel wireless networking interface 125 operates on. The onboard computing device 115 can instead using the BLUETOOTH network 145 for communication in the blackout region C, or pre-cache the information needed to replay when the transportation vehicle is in the blackout region C.

For example, in some implementations, the onboard computing device 115 determines based on the current route and destination that the transportation vehicle will reach the region C in 20 minutes and will travel within the region C for 10 minutes. In the meanwhile, the mobile phone 130 is currently sending a video stream for a movie to the onboard computing device 115; and the onboard computing device 115 is playing the movie in real time on the touch screen 120 as the device 115 continues receiving the video stream. Since the WIFI network 135 still has extra bandwidth, the onboard computing device 115 instructs the mobile phone 130 to send out the video stream in a higher speed.

As a result, the onboard computing device 115 has pre-cached the video stream data enough for playing in the next 30 minutes, before the transportation vehicle 105 reaches the blackout region C. Even if the WIFI network 135 does not work due to the WIFI interference in the blackout region C, the onboard computing device 115 now has enough pre-cached video stream data in the local storage to continue playing the move without any disruption during the time period when the transportation vehicle travels within the blackout region C.

In some implementations, the onboard computing device 115 can determine that the device 115 is not able to pre-cache enough data for playing during the time period that the transportation vehicle 105 travels within the blackout region C. Instead, the onboard computing device 115 can instruct the automotive navigation system to generate an alternative route from the current vehicle location to the destination location. The alternative route avoids the identified blackout region C. Alternatively, the onboard computing device 115 can present a prompt to the driver (e.g., on its touch screen)

that there is a risk of encountering blackout areas if the driver follows the current route generated by the automotive navigation system.

In some implementations, the onboard computing device 115 stores the wireless interference data in the local storage. The wireless interference data include, e.g., the location coordinates of the blackout areas, the timestamp associated with the blackout areas, the number of nearby access points, the WIFI signal strengths of the nearby access points, and the channels at which the nearby access points operate. In some other implementations, the onboard computing device 115 can share the wireless interference data with other onboard computing devices of other vehicles though a server 180.

The wireless interference data can be transmitted to the server 180 either directly from the onboard computing device 115 or via the mobile phone 130. In some embodiments, the onboard computing device 115 of the transportation vehicle 105 includes a WAN (wide area network, e.g., the Internet) interface 192 for connecting to the server 180 over the Internet 190. The onboard computing device 115 sends the collected wireless interference data to the server 180. Other onboard devices from other vehicles send their collected wireless interference data to the server 180 as well. The server 180 aggregates these wireless interference data and generates a wireless interference map indicating the location and time of the wireless blackout spots. The server 180 sends back the relevant portion of the wireless interference map to the onboard computing device 115 to help the onboard computing device 115 to recognize the blackout areas. In some other implementations, instead of sending data to the server 180 through the WAN interface 192, the onboard computing device 115 can instruct the mobile phone 130 to transmit the wireless interference data to the server 180 though a WAN interface 132 (e.g., a 4G mobile telecommunication interface) of the mobile phone 130.

In some implementations, the onboard computing device 115 can provide a user interface for the driver or passenger to manually tag an area as blackout area. For example, if a user experiences significant interference, the user can click on a map displayed on the touch screen of the onboard computing device 115 to indicate the location of the blackout area. The information about the manually tagged blackout area can be transmitted to the server 180 along with information about other blackout areas.

Besides the network connection between the mobile phone 130 and the onboard computing device 115 within the transportation vehicle 105, the technology disclosed herein can be applied to other scenario as well. For example, in some implementations, an unmanned aerial vehicle (UAV, also referred to as drone) can include an onboard computing device that establishes a wireless network connection with a base station. The onboard computing device can communicate with the base station for sending or receiving, e.g., routing instructions, video signals, surveillance data, location data, etc. The network connection of the UAV can be interfered by WIFI signals from nearby access points, especially when the UAV travels in an area of a dense population. The onboard computing device of the UAV can apply the disclosed technology to minimize the interference caused by the nearby access points.

In some implementations, a fitness tracking device (e.g., a fitness tracking wristband or a fitness tracking smart watch) includes an onboard computing device that establishes a wireless network connection (e.g., BLUETOOTH connection) with a mobile phone. The wireless network connection enables the fitness tracking device to send fitness data (e.g., speed data, location data, calories data, heart rate data, etc.) to the mobile phone in real time. The network connection of the fitness tracking device can be interfered by nearby WIFI access points, as the runner or the cycler who wears the fitness tracking device travels in an area of dense population. The onboard computing device of the fitness tracking device can apply the disclosed technology to minimize the interference caused by the nearby access points.

Figure 2:
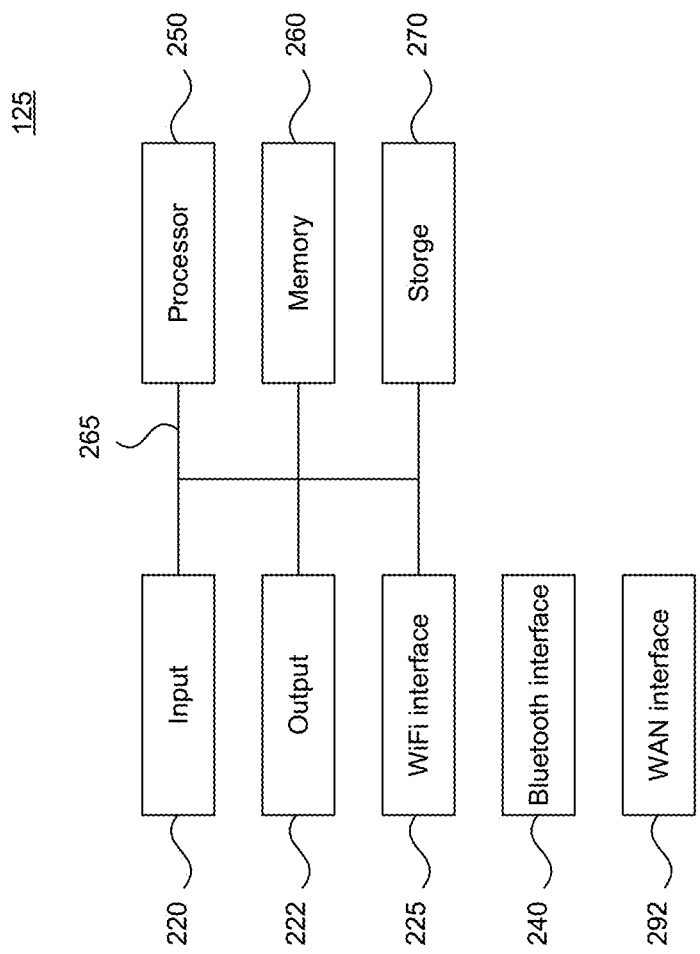
FIG. 2 shows components of an onboard computing device that can be implemented inside of a transportation vehicle.

FIG. 2 shows components of an onboard computing device 215 that can be implemented inside of a transportation vehicle (e.g. as device 115). The components are inter-connected by a bus 265. The onboard computing device 215 serves as a mobile platform (e.g., a computing platform in a vehicle) to blend personal area network (PAN), local area network (LAN), and wide area network (WAN) seamlessly to ensure continuous and proper communication between the onboard computing device 215 and other devices. The onboard computing device 215 includes a WIFI interface 225, a BLUETOOTH interface 240 and a WAN interface 292.

In some implementations, some of the interfaces can be implemented together as a single component (e.g., a single chip or board). For example, a single network interface can include one or more radios for making one or more simultaneous communication connections (e.g., wireless, BLUETOOTH, low power BLUETOOTH, cellular systems, PCS systems, or satellite communications).

As discussed with respect to FIG. 1, the onboard computing device 215 in a vehicle has unique challenges that need to be addressed. The onboard computing device 215 needs to establish a reliable wireless connection with other devices (e.g., mobile smart phone) for various applications. Although BLUETOOTH is used in mobile platform applications (e.g., hands-free phone call), BLUETOOTH is not an effective solution for applications that require a high-bandwidth throughput (e.g., video streaming).

In some implementations, the onboard computing device 215 deploys WIFI network in conjunction with BLUETOOTH to address the need of a high-bandwidth wireless network connection. For example, the onboard computing device 215 can use BLUETOOTH for establishing the initial wireless handshake and transferring network keys over via the BLUETOOTH interface 240 to order to establish a high-bandwidth WIFI connection via the WIFI interface 225. The onboard computing device 215 can include dedicate firmware to ensure seamless and pervasive connection of BLUETOOTH and fixed point-to-point wireless connection.

The transportation vehicle containing the onboard computing device 215 can travel in a high speed to various locations. Also the onboard computing device 215 can maintain a high-bandwidth WIFI connection with the other devices (e.g., mobile smart phone). But at the locations through which the transportation vehicle travels, there can be severe WIFI interferences caused by nearby wireless access points (e.g., as shown in Region C of FIG. 1). These locations are referred to as blackout areas. At the blackout areas, the WIFI interferences cause data transmission interruption and force the mobile phone to resend data to the onboard computing device 215. The result is that the user experiences delay or disruption on the application (e.g., delay of movie playing).

In order to avoid excessive WIFI interference, the onboard computing device 215 can dynamically switch channels so that the communication between the onboard computing device 215 and the mobile phone can be conducted on a less crowded radio band.

The onboard computing device 215 further includes an input 220 including one or more input devices can be configured to receive instructions and information. For example, in some implementations input 220 can include a number of buttons. In some other implementations input 220 can include one or more of a touch pad, a touch screen, a cable interface, a knob, and any other such input devices known in the art.

The WIFI interface 225 can establish a mobile wireless network connection (WIFI connection) with a mobile device. Furthermore, the WIFI interface can detect interfering WIFI signals transmitted from nearby WIFI access points in a region which the transportation vehicle travels, and measures the strength of the interfering WIFI signals.

The onboard computing device 215 further includes an output 222 configured to deliver a presentation in real time when the WIFI interface continues receiving data streams from the mobile device for the presentation. Such a presentation can be a video, an audio, a slideshow, a video game, a navigation session, a user graphic interface session, etc.

The onboard computing device 215 further includes a processor 250. The processor can identify a blackout area based on the detected interfering signals from the nearby WIFI access points. The blackout area has wireless interference from the access points that is strong enough to have a negative impact to the real-time receiving of the data streams for the presentation.

The WAN interface 292 is configured to connect the onboard computing device 215 to a remote server (e.g., the server 180 shown in FIG. 1). The remove server is responsible for aggregating information regarding blackout areas and nearby access points from the onboard computing device 215 and other devices in other transportation vehicle to generate a wireless interference blackout map.

The onboard computing device 215 includes a memory 260 and a storage 270. Memory 260 can be volatile or non-volatile memory. Storage 270 can be integrated or removable storage such as Secure Digital, Secure Digital High Capacity, Memory Stick, USB memory, compact flash, xD Picture Card, solid-state drive (SSD) or a magnetic hard drive.

The storage 270 is configured to store information regarding the blackout areas and nearby access points, as well as a commuting historical data of times and location that the transportation vehicle has travelled. Using the commuting historical data stored in the storage 270, the processor 250 can recognize a commuting pattern of the transportation vehicle.

In some implementations, the onboard computing device 215 can receive via the input 220 a user input designating a destination for the next trip of the transportation vehicle. The processor 250 can identify a potential route towards the destination for the vehicle. In some other implementations, the onboard computing device 215 does not receive any user input designating a destination. Instead, the processor 250 can determine a candidate destination according to the commuting pattern recognized based on the commuting historical data of the vehicle. Then the processor 250 can identify a potential route towards the candidate destination.

Once the potential route is identified, the processor 250 can compare the potential route against a list of blackout areas stored in the storage 270 to identify at least one blackout area though which the transportation vehicle likely is going to travel. If there is at least one blackout area identified, the onboard computing device can take various measures to remedy the potential impact of the blackout area to the in-vehicle WIFI network communication.

In some implementations, the processor 250 can switch the mobile wireless network connection from an original wireless channel to a new wireless channel. The reasons for the switching is that the new wireless channel experiences less wireless interference in the blackout areas comparing to the original wireless channel.

In some other implementations, the processor 250 sends to the mobile device a request to retrieve upfront the data needed for continuously delivering the presentation for a time period when the transportation vehicle will travel within the blackout area. The onboard computing device 215 then pre-caches the needed data in the storage 270. During the time period when the transportation vehicle travels within the blackout area, the onboard computing device 215 can continuously deliver the presentation to the output 222 by using the pre-cached data, even if the mobile wireless network connection is severely impacted by the interference of the blackout area.

The onboard computing device 215 can determine whether the surrounding signal of the area severely interferes with the mobile wireless network connection. If the interference is severe, the onboard computing device 215 marks the area as a blackout area. In some implementations, the onboard computing device 215 can determine whether the interference is severe, by considering various factors such as the number of nearby access points, the WIFI signal strengths of the nearby access points, the signal strength of the mobile wireless network connection, the channel differences between the mobile wireless network connection and the nearby access points.

Figure 3:
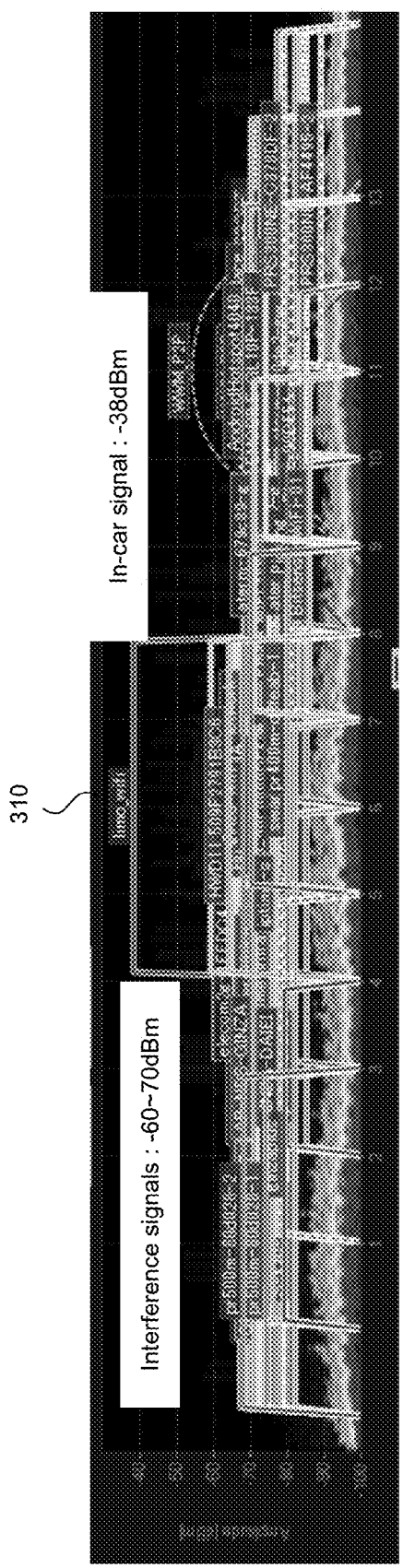
FIG. 3 shows the wireless interferences caused by a large number of access points of a blackout area
Figure 3:
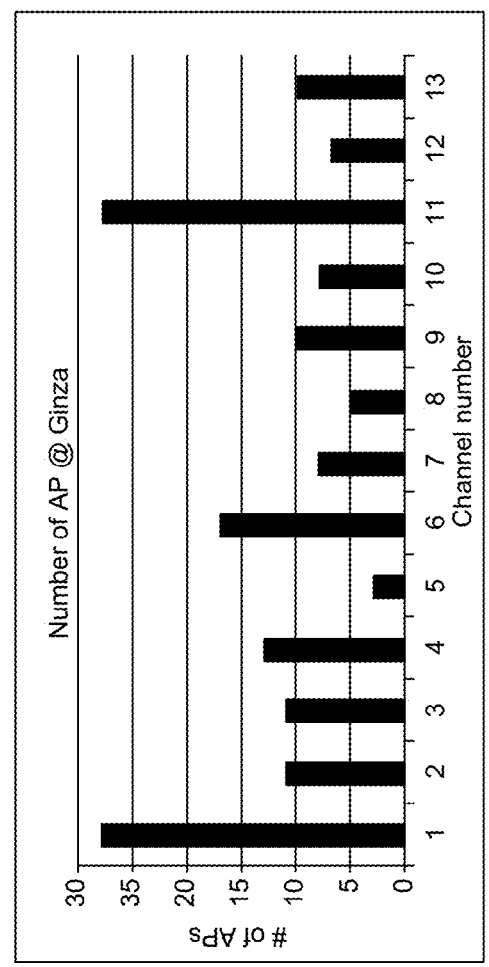

FIG. 3 shows the wireless interference caused by a large number of access points of a blackout area in Ginza district of Tokyo. The upper portion of FIG. 3 visualizes the signal strengths of the various access points. The signal strengths are measured at a location within a transportation vehicle. Within the transportation vehicle, an onboard computing device maintains a wireless network connection with an in-car mobile device (e.g., a mobile phone of the vehicle driver). In FIG. 3, the in-car wireless network connection 310 is identified by its SSID (Service Set Identifier) "limo_wife". The rest of the SSIDs illustrated in FIG. 3 represent the interference signals caused by nearby access points.

Each SSID has an associated line in the upper portion of FIG. 3. The height of the line represents the signal strength of the network of the corresponding SSID. For example, the in-car wireless network connection 310 has a signal strength of −38 dBm. The interference signals caused by nearby access points have signal strengths of around −60~−70 dBm.

The lower portion of FIG. 3 shows the total number of access points for each channel. There are a large number of access points detected across the 13 channels of the 2.4 GHz band. (In Japan access points are allowed to utilize the channels 12 and 13 of the 2.4 GHz band, which are restricted in North America.) For some bands such as the channels 1 and 11, the number of occupied access points exceeds 25. In contrast, some bands (e.g., 5 and 8) have significantly less number of occupied access points. By observing the distribution of the access points across the 2.4 GHz bands, the onboard computing device can decide that the channel 5 is the least crowded channel with less interference. Accordingly, the onboard computing device switches the WIFI connection with the mobile device to channel 5.

Figure 4:
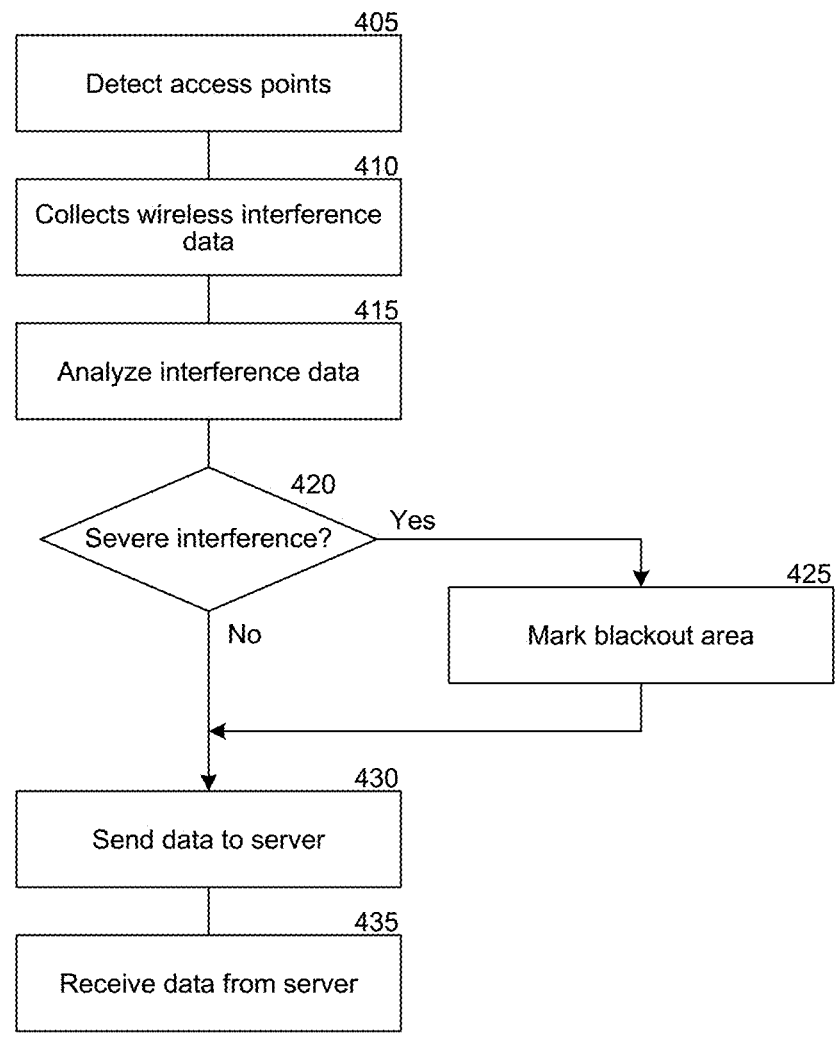
FIG. 4 shows steps for detecting black out areas that have substantial wireless interference.

FIG. 4 shows steps for detecting black out areas that have substantial wireless interference. When a transportation vehicle travels through a region, an onboard computing device installed in the transportation vehicle (e.g., the onboard computing device 115 or 215) detects (405) one or more nearby wireless access points. The onboard computing device collects (410) wireless interference data based on the wireless access points detected in the region. The wireless interference data can include, e.g., a number of nearby access points detected, WIFI signal strengths of the nearby access points, and channel numbers at which the nearby access points operate.

The onboard computing device analyzes (415) the wireless interference data to determine a level of wireless interference for the region. The level of wireless interference can also depend on the signal strength of the in-vehicle WIFI network between the onboard computing device and the mobile device. If the level of the wireless interference for the region is severe (420), the onboard computing device marks (425) the region as a blackout area.

In some implementations, the onboard computing device can determine whether the interference is severe, by considering various factors such as the number of nearby access points, the WIFI signal strengths of the nearby access points, the signal strength of the mobile wireless network connection, the channel differences between the mobile wireless network connection and the nearby access points. For example, in some implementations, the onboard computing device can set a threshold value for the difference between the signal strength of the mobile wireless network connection and the average signal strength of the nearby access points. If the signal strength difference exceeds the threshold value, the onboard computing device determines that the interference is severe.

In some other implementations, the onboard computing device can set a threshold value for the number of nearby access points broadcasting on a given channel. If the access point number exceeds the threshold value, the onboard computing device determines that the interference on that channel is severe. In some implementations, when the onboard computing device determines that the prior communication throughput is less than the communication throughput needed for the current usage, the device decides that the interference is severe. In some implementations, the onboard computing device monitors a level of user frustration indicated by user inputs. For example, if the user manually switch channel in a frequent manner, the user actions indicate a high level of frustration. The onboard computing device can determine a severe interference based on the high level of frustration. In some implementations, the onboard computing device can determine a severe interference based on a weighted combination of various factors (e.g., the factors discussed above).

The onboard computing device can further send (430) the collected wireless interference data, location information of the region, and a timestamp to a server. The server is responsible for aggregating the wireless interference data received from multiple devices installed in transportation vehicles travelling at multiple locations. The onboard computing device can also receive (435) wireless interference data for other regions or identification of other blackout areas from the server.

FIG. 2 shows a system (e.g., onboard computing device 215) capable of performing these steps described in FIG. 4. The steps described in FIG. 4 need not be performed in the order recited and two or more steps can be performed in parallel or combined.

Figure 5:
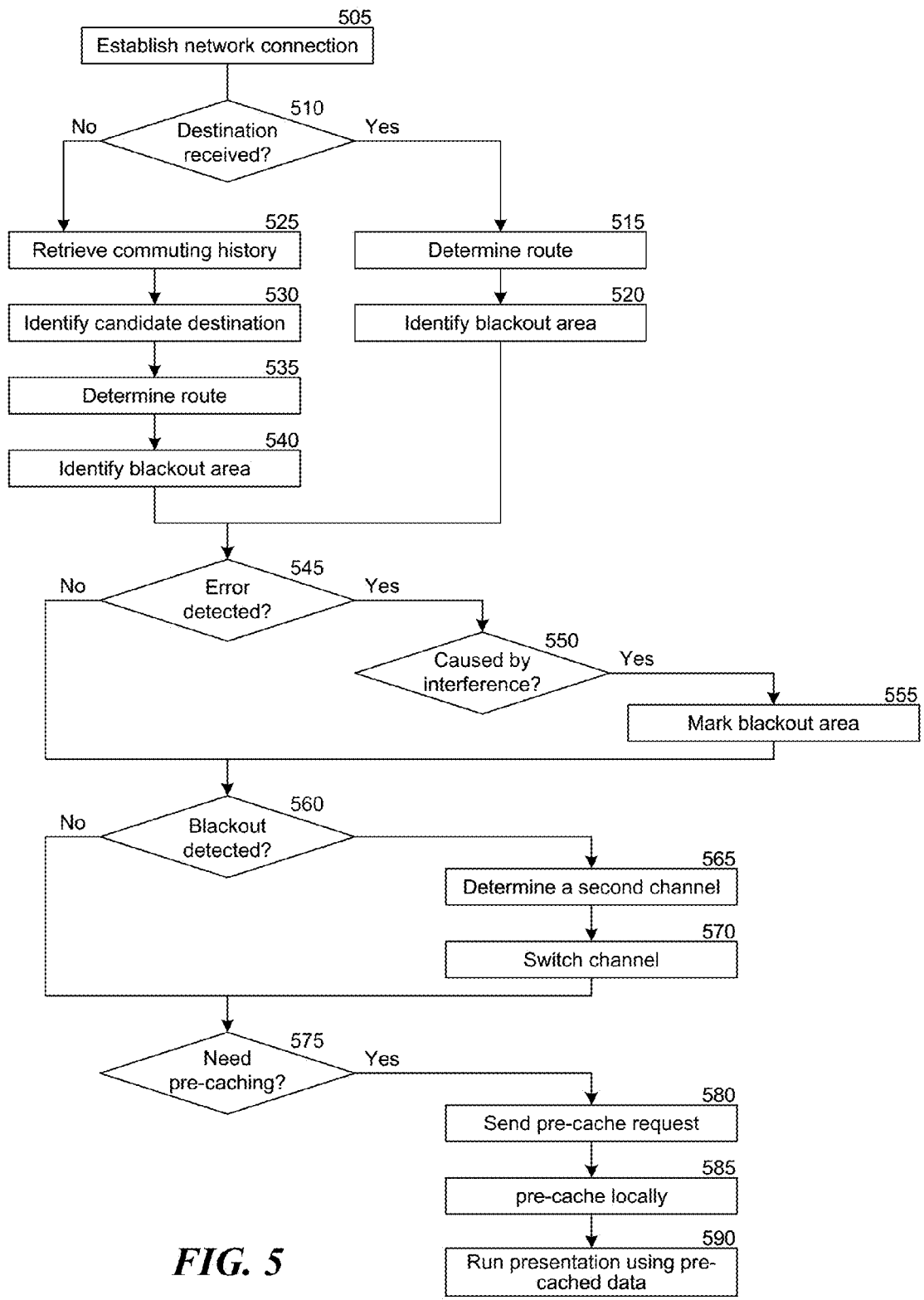
FIG. 5 shows steps for optimizing wireless network connection in a transportation vehicle to minimize impact of wireless interference.

FIG. 5 shows steps for optimizing wireless network connection in a transportation vehicle to minimize impact of wireless interference. Such a transportation vehicle can be, e.g., a car, a motorcycle, a land vehicle, a ship, a boat, a hovercraft, a submarine, an airplane, a helicopter, or an unmanned aerial vehicle (UAV). The onboard computing device of the transportation vehicle establishes (505) a mobile wireless network connection with a mobile device on a first wireless channel.

The onboard computing device determines whether an input from a driver of the transportation vehicle is received to designate a candidate destination for navigation purpose (510). If such an input is received, the onboard computing device determines (515) a route along which the transportation vehicle likely will travel to reach the candidate destination. Using the route, the onboard computing device identifies (520) a blackout area in the route based on historical wireless interference data. The blackout area has significant wireless interference to the mobile wireless network connection on the first wireless channel.

If such an input is not received, the onboard computing device retrieves (525) a commuting history of times and locations that the transportation vehicle has travelled. The commuting history can be stored in a local storage of the onboard computing device. The onboard computing device can identify (530) a candidate destination based on a commuting pattern recognized based on the recorded commuting history. The onboard computing device further determines (535) a route along which the transportation vehicle likely will travel to reach the candidate destination. Using the route, the onboard computing device identifies (540) a blackout area in the route based on historical wireless interference data.

Blackout areas can also be determined if a wireless transmission error is detected (545) in the mobile wireless network connection between the onboard computing device and the mobile device. In some implementations, the onboard computing device detects the transmission error by identifying a late video frame, or a corrupted video frame received from the mobile phone.

If such an error is detected, the onboard computing device determines (550) that the wireless transmission error is caused by wireless interference in a current region at which the transportation vehicle travels. The onboard computing device further marks (555) the current region as a blackout area.

If a blackout area is detected along the route (560), the onboard computing device can minimize the impact of wireless interference by switching wireless channel. The onboard computing determines (565) a second wireless channel for the mobile wireless network connection, as the mobile wireless network connection on the second wireless channel experiences less wireless interference in the blackout area than the mobile wireless network connection on the first wireless channel. The onboard computing device then switches (570) the mobile wireless network connection to the second wireless channel, before the transportation vehicle reaches the blackout area.

The channel switching process is a handshake process between the onboard computing device and the mobile phone. The onboard computing device first sends a request to the mobile phone to change the WIFI channel. The mobile phone acknowledges and approves the change of the WIFI channel. The onboard computing device stops wireless beaconing on the current channel and starts wireless beaconing on the newly switched channel. The mobile phone then resumes the presentation application session (e.g., resumes playing a video) on the newly switched channel.

The onboard computing device can determine that data pre-caching is further needed (575). For example, if the blackout area has very severe wireless interference or if the current presentation application requires a high-bandwidth throughput that is close to the network limit, the presentation can still be disrupted even after channel switching. Such a presentation can be a video, an audio, a slideshow, a video game, a navigation session, a user graphic interface session, etc. In such a scenario, data pre-caching ensures the proper presentation even when the wireless network does not work due to the interference.

The onboard computing device sends (580) to the mobile device a request to retrieve upfront the data needed for running an application for a time period when the transportation vehicle is going to travel within the blackout area. The onboard computing device pre-caches (585) the needed data in a local storage of the onboard computing device. During the time period when the transportation vehicle travels within the blackout area, the onboard computing device runs (590) the presentation application by using the pre-cached data, without a need for the mobile wireless network connection.

FIG. 2 shows a system (e.g., onboard computing device 215) capable of performing these steps described in FIG. 5. The steps described in FIG. 5 need not be performed in the order recited and two or more steps can be performed in parallel or combined.

A number of implementations have been disclosed herein. Nevertheless, it will be understood that various modifications can be made without departing from the spirit and scope of the claims. Accordingly, other implementations are within the scope of the following claim.

What is claimed is:

1. A method of optimizing a wireless network connection in a transportation vehicle, comprising steps of:
    establishing a mobile wireless network connection between an onboard computing device placed in the transportation vehicle and a mobile device on a first wireless channel;
    identifying by the onboard computing device a blackout area in a route along which the transportation vehicle travels, the blackout area having significant wireless interference to the mobile wireless network connection on the first wireless channel;
    determining by the onboard computing device a second wireless channel for the mobile wireless network connection, the mobile wireless network connection on the second wireless channel experiencing less wireless interference in the blackout area than the mobile wireless network connection on the first wireless channel; and
    switching by the onboard computing device the mobile wireless network connection to the second wireless channel, before the transportation vehicle reaches the blackout area.

2. The method of claim 1, further comprising:
    detecting one or more nearby access points in a region in which the transportation vehicle currently travels;
    collecting by the onboard computing device wireless interference data based on the access points detected in the region;
    analyzing the wireless interference data to determine a level of wireless interference for the region; and
    if the level of wireless interference for the region is severe, marking the region as a blackout area.

3. The method of claim 2, wherein the wireless interference data include a number of nearby access points detected, WIFI signal strengths of the nearby access points, or channel numbers at which the nearby access points operate.

4. The method of claim 2, further comprising:
    sending the collected wireless interference data, location information of the region, and a timestamp to a server, the server aggregating the wireless interference data received from multiple devices installed in transportation vehicles travelling at multiple locations; and
    receiving wireless interference data for other regions or identification of other blackout areas from the server.

5. The method of claim 1, wherein the identifying the blackout area comprises:
    detecting a wireless transmission error in the mobile wireless network connection between the onboard computing device and the mobile device;
    determining that the wireless transmission error is caused by wireless interference in a current region at which the transportation vehicle travels; and
    marking the current region as a blackout area and determining to switch wireless channel in order to reduce the wireless interference.

6. The method of claim 1, wherein the identifying the blackout area comprises:
    determining by the onboard computing device a candidate destination and the route along which the transportation vehicle travels to reach the candidate destination; and
    identifying the blackout area in the route based on historical wireless interference data.

7. The method of claim 6, further comprising:
    receiving at the onboard computing device an input from a driver of the transportation vehicle to designate a candidate destination for navigation purpose.

8. The method of claim 6, further comprising:
    recording by the onboard computing device a commuting history of times and locations that the transportation vehicle travels; and
    identifying a candidate destination by the onboard computing device based on a commuting pattern recognized based on the recorded commuting history.

9. The method of claim 1, wherein the transportation vehicle is a car, a motorcycle, a land vehicle, a ship, a boat, a hovercraft, a submarine, an airplane, a helicopter, or an unmanned aerial vehicle (UAV).

10. The method of claim 1, further comprising:
    determining that transportation vehicle is travelling along the route towards the blackout area;
    sending from the onboard computing device to the mobile device a request to retrieve upfront the data needed for running an application for a time period when the transportation vehicle is going to travel within the blackout area;
    pre-caching the needed data in a local storage of the onboard computing device; and
    running the application on the onboard computing device by using the pre-cached data, without a need for the mobile wireless network connection, during the time period when the transportation vehicle travels within the blackout area.

11. A method of enhancing a wireless network connection in a transportation vehicle, comprising steps of:
    maintaining a mobile wireless network connection between an onboard computing device placed in the transportation vehicle and a mobile device;
    identifying by the onboard computing device a destination towards which the transportation vehicle is going to travel;
    determining a potential route towards the destination that the transportation vehicle likely takes;
    comparing the potential route against a list of blackout areas to identify one or more blackout areas through which the transportation vehicle likely will travel, each of the blackout areas being known to have significant wireless interference cause by access points in the blackout areas;

conducting a counter measure by the onboard computing device to remedy anticipated wireless interference in the identified blackout areas, to ensure that a user experience based on the mobile wireless network connection is not disrupted by the anticipated wireless interference in the identified blackout areas.

12. The method of claim 11, wherein the counter measure comprises:

switching by the onboard computing device the mobile wireless network connection from a first wireless channel to a second wireless channel, wherein second wireless channel experiences less wireless interference in the blackout areas comparing to the first wireless channel.

13. The method of claim 11, wherein counter measure comprising:

sending from the onboard computing device to the mobile device a request to retrieve upfront the data needed for running an application for a time period when the transportation vehicle is going to travel within the blackout areas;

pre-caching the needed data in a local storage of the onboard computing device; and running the application on the onboard computing device by using the pre-cached data, without a need for the mobile wireless network connection, during the time period when the transportation vehicle travels within the blackout areas.

14. The method of claim 11, further comprising:

determining that the wireless interference is so severe that the mobile wireless network connection does not operate properly after channel switching;

sending an instruction from the onboard computing device to the mobile device an instruction to switch to a low-bandwidth mode; and replacing the mobile wireless network connection with a low-bandwidth wireless connection through which the onboard computing device and the mobile device communicate in real time in a low-bandwidth mode during a time period when the transportation vehicle travels within the blackout areas.

15. The method of claim 14, wherein the mobile wireless network connection is a WIFI connection in the transportation vehicle, and the low-bandwidth mode is a BLUETOOTH connection.

16. An onboard computing device configured to be placed in a transportation vehicle, comprising:

a wireless networking interface configured to establish a mobile wireless network connection with a mobile device, the wireless network interface further configured to detect signals of nearby access points in a region in which the transportation vehicle travels;

an output component configured to deliver a presentation in real time when the wireless networking interface continues receiving data streams for the presentation from the mobile device;

a processor configured to identify a blackout area based on the detected signals of nearby access points, wherein the blackout area has wireless interference from the nearby access points to impact the real-time receiving of data streams for the presentation.

17. The onboard computing device of claim 16, further comprising:

a local storage configured to store information regarding the blackout areas and nearby access points, the local storage further configured to store a commuting historical data of times and location that the transportation vehicle travels; and wherein the processor is further configured to recognize a commuting pattern of the transportation vehicle based on the commuting historical data.

18. The onboard computing device of claim 17, wherein the processor is further configured to perform steps of:

if the onboard computing device receives a user input designating a destination, identifying a potential route towards the destination;

if the onboard computing device does not receive a user input designating a destination, determining a candidate destination based on the commuting pattern, identifying a potential route towards the candidate destination;

comparing the potential route against a list of blackout areas stored in the local storage to identify a blackout area through which the transportation vehicle likely is going to travel;

sending to the mobile device a request to retrieve upfront the data needed for continuously delivering the presentation for a time period when the transportation vehicle will travel within the blackout area;

pre-caching the needed data in the local storage of the onboard computing device; and continuously delivering the presentation by using the pre-cached data, without a need for the mobile wireless network connection, during the time period when the transportation vehicle travels within the blackout area.

19. The onboard computing device of claim 17, wherein the processor is further configured to perform steps of:

if the onboard computing device receives a user input designating a destination, identifying a potential route towards the destination;

if the onboard computing device does not receive a user input designating a destination, determining a candidate destination based on the commuting pattern, identifying a potential route towards the candidate destination;

comparing the potential route against a list of blackout areas stored in the local storage to identify a blackout area through which the transportation vehicle likely is going to travel; and switching the mobile wireless network connection from a first wireless channel to a second wireless channel, wherein second wireless channel experiences less wireless interference in the blackout areas comparing to the first wireless channel.

20. The onboard computing device of claim 16, further comprising:

a wide area network (WAN) interface configured to connect the onboard computing device to a remote server, the server aggregating information regarding blackout areas and nearby access points from the onboard computing device and other devices in other transportation vehicle to generate a wireless interference blackout map.

* * * * *